INVENTORS.
JOHN M. TINSLEY &
WILLIAM T. MALONE

BY
Dunlap, Laney, Hessin & Dougherty
ATTORNEYS

United States Patent Office 3,572,354
Patented Mar. 23, 1971

3,572,354
METHOD OF REDUCING FRICTION LOSSES IN THE FLOW OF AQUEOUS FLUIDS
John M. Tinsley and William T. Malone, Duncan, Okla., assignors to Halliburton Company, Duncan, Okla.
Filed Nov. 21, 1969, Ser. No. 878,794
Int. Cl. F17d 1/16
U.S. Cl. 137—13                                    10 Claims

ABSTRACT OF THE DISCLOSURE

The present invention relates to an improved method of reducing friction losses in the flow of aqueous fluids containing alkaline-earth metal ions, such as the brines commonly used in fracturing oil, gas and water well formations. By the present invention quantities of a monovalent alkali metal salt and an anionic water soluble polymer of acrylamide are added to the aqueous fluid in particular amounts of each, and the resulting mixture is flowed through the conduit.

BACKGROUND OF THE INVENTION

(1) Field of the invention

The present invention relates to a method of reducing friction losses in the flow of aqueous fluids, and more particularly, but not by way of limitation, to an improved method of reducing friction losses in the flow of aqueous fluids such as brines by the addition of an anionic acrylamide polymer thereto.

(2) Description of the prior art

In the flow of fluids through a conduit, friction losses between the walls of the conduit and the fluid are encountered. In many applications it is desirable to transfer aqueous fluids at high velocities through a conduit of appreciable length. In these applications, the aqueous fluid is commonly forced through the conduit by conventional pumping apparatus, and considerable horsepower energy must be expended to overcome the pressure drop in the fluids caused by friction losses. For example, in fracturing of formations in oil, gas and water wells, a fracturing fluid is injected through a conduit disposed in the well bore into the formation to be fractured. In this type of operation, it is essential that a sufficient amount of the fracturing fluid is injected into the formation in order to build up the pressure required to produce cracks of fractures therein. Because of fluid losses to the formation during injection of the fracturing fluid, it is often necessary to inject the fluid into the well at high velocities in order to obtain the required pressure build-up. Even though fluid loss additaments are commonly added to the fracturing fluids to limit loss thereof into the formation, high fracturing fluid velocities are generally required, and as a result, considerable pumping horsepower must be available at the surface to overcome friction losses, as well as to provide the required fluid velocities and pressure build-up in the formation.

In recent years additaments have been developed which when added to aqueous fracturing fluids and the like in small quantities, decrease the friction loss encountered in high velocity or turbulent flow of the fluids through a conduit. One of the more successful methods used comprises adding a small quantity of an acrylamide polymer to the aqueous fluid. Since aqueous fluids are most commonly used for fracturing formations in oil, gas and water wells, and a variety of additaments are generally added to the fluid to control the properties thereof such as viscosity, fluid loss, etc., polymers of acrylamide have been found to be particularly useful as additaments for fracturing fluids in that they greatly reduce friction losses encountered without appreciably changing the other properties of the fluid.

Various polymers of acrylamide of the anionic, non-ionic and cationic type have been used successfully for reducing friction losses in the flow of aqueous fluids. Generally, anionic polymers of acrylamide have been found to produce the highest friction reduction in aqueous fluids as compared to cationic or non-ionic. However, anionic polymers of acrylamide lose their friction reduction effectiveness when added to an aqueous fluid containing divalent alkaline-earth metal ions such as calcium or magnesium. Since formation brine is commonly available in field locations, it is very often used as a well formation fracturing fluid. However, brine generally contains both calcium and magnesium ions, and as a result, non-ionic or cationic acrylamide polymers have been used as friction reducing additaments for brine rather than anionic acrylamide polymers.

The present invention provides an improved method of reducing friction losses in the flow of aqueous fluids containing divalent alkaline-earth metal ions wherein anionic polymers of acrylamide may be added to the fluid without losing their effectiveness as friction reducers.

SUMMARY OF THE INVENTION

The present invention is directed to a method of reducing friction losses in the flow of aqueous fluids containing divalent alkaline-earth metal ions through a conduit which comprises dissolving an effective quantity of a monovalent alkali metal salt in the aqueous fluid, then adding an effective quantity of a water soluble anionic polymer of acrylamide to the solution and flowing the resulting solution through the conduit.

The objects and advantages of the invention will be apparent from the detailed description which follows.

DESCRIPTION OF THE PREFERRED EMBODIMENTS

Figure 1:
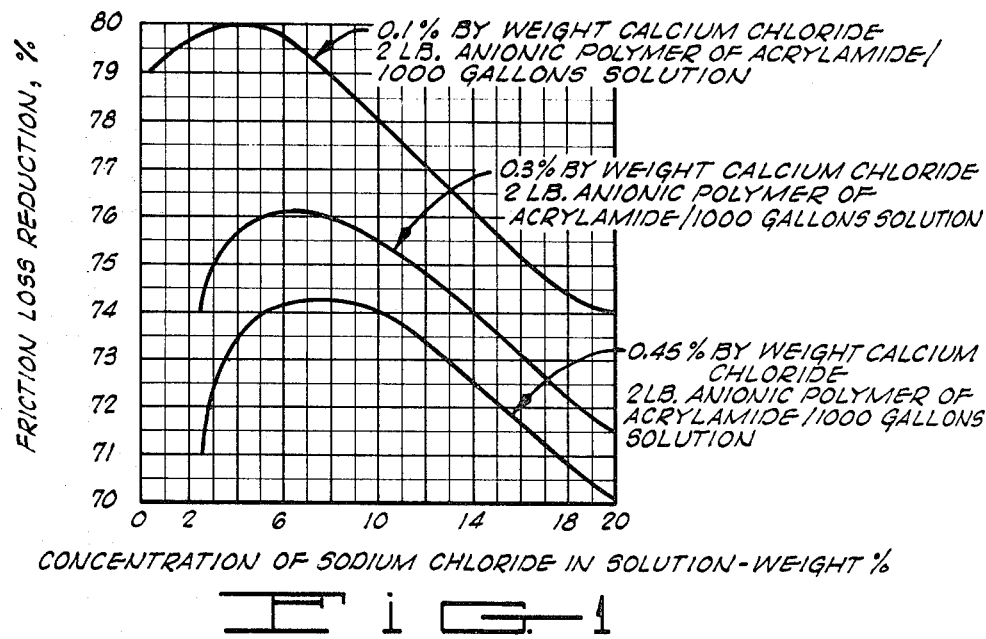
FIG. 1 is a graph showing the friction loss reduction obtained for various calcium chloride-water solutions containing varying concentrations of dissolved sodium chloride and a particular quantity of an anionic polymer of acrylamide.

It has been observed by the applicants that linear, high molecular weight, water soluble polymers of acrylamide, when added to aqueous fluids in particular quantities, substantially reduce the friction losses encountered in the flow of the fluids through a conduit. The polymers may be homopolymers, random copolymers or random terpolymers obtained by polymerizing acrylamide or acrylic acid with or without suitable comonomers to form essentially linear, water soluble polymers. Polymers and copolymers of polyacrylamide may be used and copolymers of acrylamide with monoethylenically or polyethylenically unsaturated monomers copolymerized therewith having at least 50 mole percent of the total polymer comprised of acrylamide are effective. When such polymers are partially hydrolized by the reaction thereof with a sufficient amount of a base, such as sodium hydroxide, they are more effective.

It has also been observed by the applicants that polymers of acrylamide of the anionic, non-ionic, and cationic type may be used, but that polymers of acrylamide of the anionic type produce superior friction loss reduction in aqueous fluids. However, when anionic polymers of acrylamide are added to aqueous fluids containing divalent alkaline-earth metal ions, such as calcium and magnesium ions, they are unstable and lose their superior friction loss reduction properties. Thus, heretofore, non-ionic and cationic polymers of acrylamide have been used as additaments for reducing friction losses in aqueous fluids containing divalent alkaline-earth metal ions in preference to polymers of the anionic type. Since brine is commonly used as a well formation fracturing fluid, and contains both calcium and magnesium, non-ionic and cationic polymers of acrylamide have been primarily used as friction reduction additaments therewith.

By the present invention additaments comprised of anionic polymers of acrylamide may be effectively used in aqueous fluids containing divalent alkaline-earth metal ions, thereby providing superior reduction of friction losses as compared to the non-nionic or cationic polymers heretofore used. Basically, this is accomplished by the addition of a particular quantity of a monovalent alkali metal salt, such as sodium chloride, to the aqueous fluid prior to adding the anionic acrylamide polymer thereto.

The anionic acrylamide polymer is added to the aqueous fluid in an amount of from about 0.005 percent by weight to about 0.1 percent by weight. At concentrations below about 0.005 percent by weight very little friction reduction is obtained, and at concentrations above about 0.1 percent by weight very little additional friction reduction is realized. The preferred amount is generally about two to three pounds of polymer per 1000 gallons of aqueous fluid.

A commercially available anionic polymer of acrylamide which may be used in accordance with the present invention is an anionic copolymer of acrylamide and sodium acrylate sold by the Halliburton Services Division of the Halliburton Company, Duncan, Okla., under the trade designation FR–14.

Another commercially available anionic polymer of acrylamide which may be used in accordance with the present invention is an anionic random copolymer of polyacrylamide and a water soluble polyethylenically unsaturated monomer. This chemical is sold by the Halliburton Services Division of the Halliburton Company under the trade desgnation FR–16.

While the above-mentioned anionic polymers of acrylamide are preferred, it will be understood that any of a wide variety of water soluble anionic polymers of acrylamide may be used.

By the present invention, a monovalent alkali metal salt is dissolved in the aqueous fluid prior to adding the anionic polymer of acrylamide thereto. The quantity of salt added may vary from about 0.1 percent by weight to about 20 percent by weight. However, the particular quantity of salt used for optimum friction loss reduction depends on the concentration of divalent alkaline-earth metal ions in the aqueous fluid. If too little or too much salt is added, less than optimum friction loss reduction may be obtained.

For example, referring to FIG. 1, the friction loss reductions obtained in laboratory tests for 0.1 percent, 0.3 percent and 0.45 percent by weight aqueous calcium chloride solutions having varying amounts of sodium chloride dissolved therein are shown in graphical form. From FIG. 1 it may be seen that the maximum friction loss reduction for a solution having a 0.1 percent by weight concentration of calcium chloride dissolved therein, and two pounds of an anionic polymer of acrylamide (FR–14) per 1000 gallons of solution added thereto, is obtained at a sodium chloride concentration in the solution of about 4.0 percent by weight. Further, it may be seen that at calcium chloride concentration of 0.3 percent and 0.45 percent by weight, optimum friction loss reductions are obtained at about 6 percent and 7.6 percent by weight concentrations of sodium chloride respectively. Thus, tests of the type described hereinbelow may be made for an aqueous fluid containing a particular concentration of alkaline-earth metal ions, and a desired concentration of an anionic polymer of acrylamide at varying concentrations of a monovalent alkali metal salt to detemine the particular quantity of alkali meal salt required for optimum friction loss reduction. Depending upon the particular concentration of alkaline-earth metal ions contained in the aqueous fluid used, some increase in friction loss reduction may be obtained at monovalent alkali metal salt concentrations as low as 0.1 percent by weight. At salt concentrations above about 20 percent weight, little additional friction loss reduction is realized.

The addition of the monovalent alkali metal salt to the aqueous fluid containing divalent alkaline-earth metal ions, such as calcium or magnesium, stabilizes the anionic acrylamide polymer and improves its effectiveness as a friction reducing agent. While sodium chloride is the preferred monovalent alkali metal salt for use in the present invention, other monovalent alkali metal salts may be used such as potassium chloride or ammonium chloride.

A number of laboratory tests were performed using the methods of the present invention for reducing friction losses in the flow of aqueous fluids containing divalent alkaline-earth metal ions.

PROCEDURE

Quantities of tap water containing various amounts of calcium chloride and magnesium chloride in solution were prepared. Since formation brine containing calcium ions in solution usually also contains magnesium ions at a concentration of about one-fourth the concentration of the calcium ions, the test solutions were prepared containing one part magnesium chloride to four parts calcium chloride. This ratio of calcium ion content to magnesium ion content was used in all test solutions.

The percent friction loss reductions for various water solutions using various additaments were obtained by pumping the solutions through a 6 foot section of a ⅜ inch diameter stainless steel pipe. A pressure tap was installed in the pipe 24 inches from the solution input end, and a Houston X–Y plotter for recording the pressure at the tap was connected thereto by a length of tubing. Each solution tested was pumped through the stainless steel pipe at a rate of 19 feet per second (turbulent flow) and the Houston plotter was set to indicate 0 friction loss reduction when pumping the solutions therethrough without having friction reducing additaments added, and 100 percent friction loss reduction when the flow of fluid through the pipe was stopped (zero pressure condition). The time base on the plotter was set for 60 seconds per inch. In each test, the particular water solution used was pumped through the stainless steel pipe for 30 seconds at which time the friction reduction additaments tested were added. The percent friction loss reduction recorded in the tables hereinbelow were taken from the X–Y plot five five minutes after adding the friction reduction additaments.

In the tests, the anionic polymer of acrylamide used was FR-14, and the cationic polymer of acrylamide used was a copolymer of acrylamide commercially available from the Halliburton Company under the trade designation FR-10.

TABLE I.—COMPARISON OF FRICTION REDUCTION OBTAINED WITH ANIONIC AND CATIONIC POLYMERS OF ACRYLAMIDE IN WATER SOLUTIONS OF VARYING CALCIUM AND MAGNESIUM CHLORIDE CONCENTRATION

| Type of polymer used | Quantity of polymer added to solution, lb./1,000 gallons | Calcium chloride concentration in solution, weight percent | Magnesium chloride concentration in solution, weight percent | Friction reduction obtained, percent |
| --- | --- | --- | --- | --- |
| Anionic | 2 | 0 | 0 | 79.0 |
| Cationic | 2 | 0 | 0 | 69.0 |
| Anionic | 2 | 0.05 | 0.0125 | 78.0 |
| Cationic | 2 | 0.05 | 0.0125 | 69.0 |
| Anionic | 2 | 0.1 | 0.025 | 75.0 |
| Cationic | 2 | 0.1 | 0.025 | 69.0 |
| Anioniz | 2 | 0.15 | 0.037 | 66.0 |
| Cationic | 2 | 0.15 | 0.037 | 70.0 |
| Anionic | 2 | 0.20 | 0.05 | 59.7 |
| Cationic | 2 | 0.20 | 0.05 | 70.0 |
| Anionic | 2 | 0.25 | 0.06 | 56.0 |
| Cationic | 2 | 0.25 | 0.06 | 70.0 |

From the above table, it may be seen that the anionic polymer of acrylamide obtained a higher friction reduction than the cationic polymer of acrylamide when added to pure water. It may also be seen that with increasing calcium and magnesium ion concenrtation in the water solution, the friction loss reduction obtained with the anionic polymer of acrylamide decreased. The friction loss reduction obtained with the cationic polymer of acrylamide was relatively uneffected by the presence of calcium and magnesium ions in the test solutions.

TABLE II.—COMPARISON OF FRICTION REDUCTION OBTAINED WITN ANIONIC AND CATIONIC POLYMERS OF ACRYLAMIDE IN WATER SOLUTIONS OF VARYING CALCIUM, MAGNESIUM AND SODIUM CHLORIDE CONCENTRATION

| Type of polymer used | Quantity of polymer added to solution, lb./1,000 gallons | Calcium chloride concentration in solution, weight percent | Magnesium chloride concentration in solution, weight percent | Friction reduction obtained, percent | | |
| --- | --- | --- | --- | --- | --- | --- |
| | | | | 2.5% by weight sodium chloride in solution | 5.0% by weight sodium chloride in solution | 10% by weight sodium chloride in solution |
| Anionic | 2 | 0 | 0 | 81.0 | 81.0 | 79.0 |
| Cationic | 2 | 0 | 0 | 66.0 | 64.0 | 68.0 |
| Anionic | 2 | 0.15 | 0.037 | 78.5 | 79.0 | 77.0 |
| Cationic | 2 | 0.15 | 0.037 | 66.0 | 65.0 | 67.0 |
| Anionic | 2 | 0.3 | 0.075 | 74.0 | 76.0 | 75.0 |
| Cationic | 2 | 0.3 | 0.075 | 66.0 | 65.0 | 67.0 |
| Anionic | 2 | 0.6 | 0.15 | 68.0 | 71.5 | 72.0 |
| Cationic | 2 | 0.6 | 0.15 | 66.0 | 67.0 | 68.0 |
| Anionic | 2 | 0.9 | 0.225 | 62.2 | 68.0 | 69.0 |
| Cationic | 2 | 0.9 | 0.225 | 66.0 | 67.0 | 68.0 |
| Anionic | 2 | 1.2 | 0.3 | | 67.0 | 67.0 |
| Cationic | 2 | 1.2 | 0.3 | | 65.0 | 68.0 |

From the above table, it may be seen that by the addition of sodium chloride to the test solutions, the friction reduction obtained with the anionic polymer of acrylamide was superior to that obtained using the cationic polymer of acrylamide.

Figure 2:
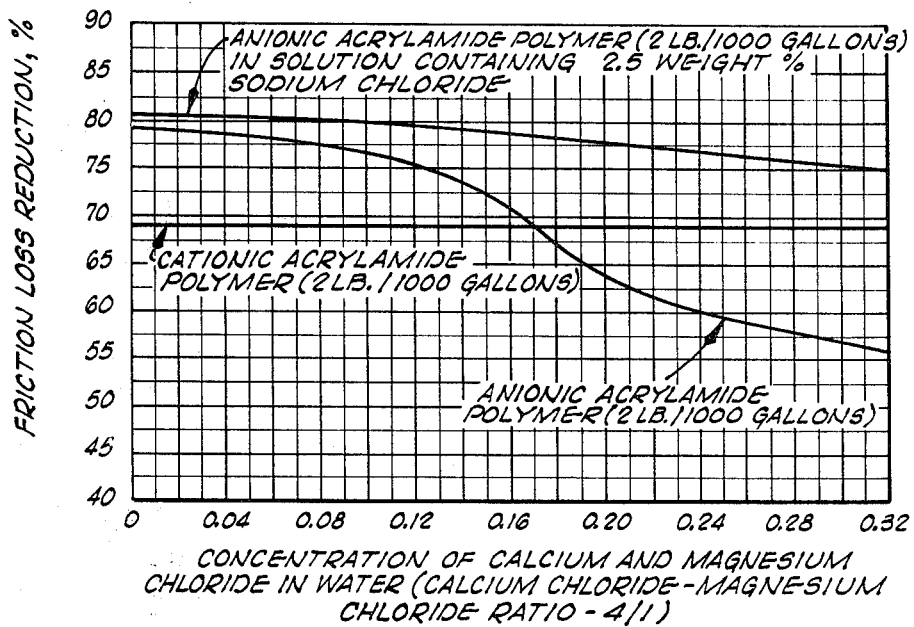
FIG. 2 is a graph showing the friction reduction obtained for water solutions containing varying concentrations of calcium and magnesium chloride by the addition of a cationic polymer of acrylamide, an anionic polymer of acrylamide and a monovalent alkali metal salt in combination with an anionic polymer of acrylamide.

Some of the test results shown in Tables I and II are shown in graphical form in FIG. 2. From FIG. 2, it may clearly be seen that the addition of sodium chloride to an aqueous fluid containing calcium and magnesium ions results in superior friction reduction when using an anionic polymer of acrylamide as compared to the use of an anionic polymer of acrylamide without the addition of sodium chloride, or as compared to the use of a cationic polymer of acrylamide.

Thus, by the present invention, a method of reducing friction loss in the flow of aqueous fluids containing divalent alkaline-earth metal ions is provided wherein higher friction reduction is obtained as compared to that obtainable using prior art methods. Furthermore, the present invention provides a method of reducing friction loss in the flow of aqueous fluids such as the brines found in well formations wherein superior friction reduction is obtained.

What is claimed is:
1. A method of reducing friction losses in the flow of aqueous fluids containing divalent alkaline-earth metal ions through a conduit comprising the steps of:
   adding an effective quantity of a monovalent alkali metal salt to the aqueous fluid;
   adding an effective quantity of a water soluble anionic polymer of acrylamide to the fluid; and
   flowing the resulting solution through the conduit.
2. The method of claim 1 wherein the monovalent alkali metal salt is selected from the group consisting of potassium chloride, ammonium chloride and sodium chloride.
3. The method of claim 2 wherein the monovalent alkali metal salt is sodium chloride.
4. The method of claim 3 wherein the sodium chloride is added to the aqueous fluid in an amount of from about 0.1 percent by weight to about 20 percent by weight.
5. The method of claim 1 wherein the anionic polymer of acrylamide is added to the aqueous fluid in an amount of from about 0.005% by weight to about 0.1% by weight.
6. In a method of reducing friction losses in the flow of brine containing calcium and magnesium ions through a conduit wherein a quantity of a polymer of acrylamide is added to the brine, the improvement comprising:
   adding an effective quantity of a monovalent alkali metal salt to the aqueous fluid;
   then adding an effective quantity of an anionic polymer of acrylamide thereto; and
   injecting the resulting mixture into the conduit.
7. The method of claim 6 wherein the monovalent alkali metal salt is selected from the group consisting of potassium chloride, ammonium chloride and sodium chloride.
8. The method of claim 7 wherein the monovalent alkali metal salt is sodium chloride.
9. The method of claim 8 wherein the sodium chloride is added to the aqueous fluid in an amount of from about 0.5% by weight to about 20% by weight.
10. The method of claim 7 wherein the anionic polymer of acrylamide is added to the aqueous fluid in an amount of from about 0.005 percent by weight to about 0.1 percent by weight.

References Cited
UNITED STATES PATENTS 3,102,548    9/1963    Smith    137—13
3,472,769    10/1969    Tummus    137—13X ALAN COHAN, Primary Examiner U.S. Cl. X.R.

252—8.55